No. 824,078. PATENTED JUNE 19, 1906.
N. HOWELL.
NUT LOCK.
APPLICATION FILED AUG. 9, 1905.

Witnesses
Jno. ?
W. N. Woodson.

Inventor
Noah Howell
By
R. A. B. Lacey, Attorneys

UNITED STATES PATENT OFFICE.

NOAH HOWELL, OF BAXTER, ARKANSAS, ASSIGNOR OF ONE-HALF TO J. H. FREEMAN, OF BAXTER, ARKANSAS.

NUT-LOCK.

No. 824,078.  Specification of Letters Patent.  Patented June 19, 1906.

Application filed August 9, 1905. Serial No. 273,429.

*To all whom it may concern:*

Be it known that I, NOAH HOWELL, a citizen of the United States, residing at Baxter, in the county of Drew and State of Arkansas, have invented certain new and useful Improvements in Nut-Locks, of which the following is a specification.

Where bolts are employed for securing several members together, much difficulty and annoyance are commonly occasioned by the fact that the nuts are continually working loose.

The object of this invention is to obviate this difficulty and provide a nut-lock which will effectively prevent any turning of the nut.

A further object is to produce a device of the character mentioned which can be quickly applied and which is so simple in construction as to be employed for construction purposes without necessitating a very material increase in cost.

For a full description of the invention and the merits thereof and also to acquire a knowledge of the details of construction of the means for effecting the result reference is to be had to the following description and accompanying drawings, in which—

Figure 1:
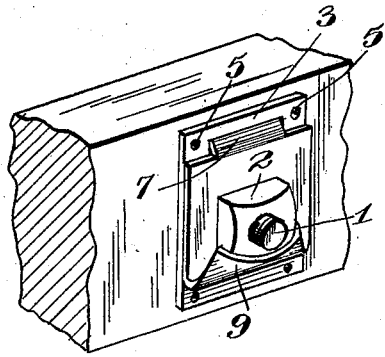
Figure 2:
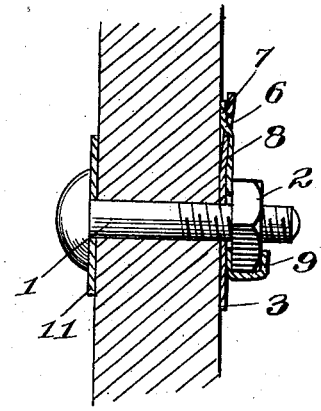
Figure 3:
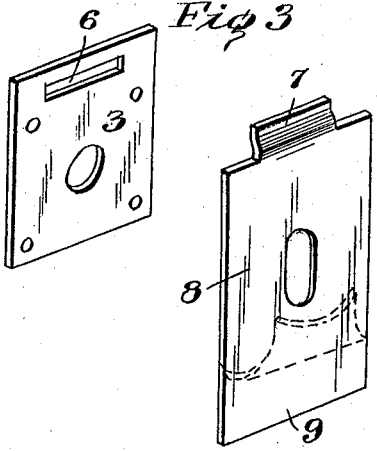
Figure 4:
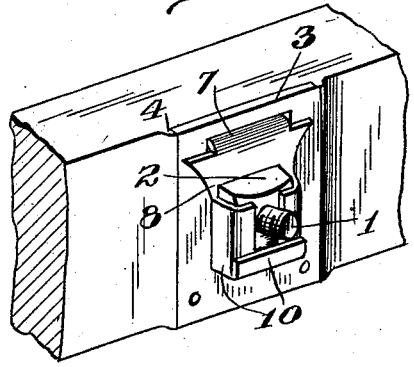

Figure 1 is a perspective view showing the application of the device. Fig. 2 is a longitudinal sectional view through the nut-lock. Fig. 3 is a detail perspective view of the separate parts. Fig. 4 is a perspective view showing a modification in which the outer washer is formed with a series of tongues.

Corresponding and like parts are referred to in the following description and indicated in all the views of the drawings by the same reference characters.

This nut-lock is adapted to be employed in connection with either metal or wood and in either case comprises two interlocking washer members, one of which engages with the surface against which the nut is screwed, while the opposite one is adapted to be bent so as to embrace a side of the nut and lock same against turning. When employed in connection with a metal surface, same is preferably formed with outwardly-projecting lugs or ridges, which engage with the lower washer member, and when used in conjunction with a wooden surface the lower washer member may be secured thereto by any suitable means, such as nails or screws.

The numeral 1 designates the bolt and 2 the nut coöperating therewith, these members being of the usual type. The lower washer 3 is shown as rectangular in shape and when placed against the metal surface is designed to engage with the outwardly-projecting ridges 4 thereon, which lock it in position and prevent it from turning. However, should the washer member 3 be placed upon a wooden surface, as shown in Fig. 2, it may be held against turning by means of screws 5. A slot 6 is located on one side of the washer member 3 and is adapted to be engaged by a tongue 7 upon the outer washer member 8. One end 9 of the washer 8 may be bent so as to embrace a side of the nut 2 and prevent same from turning, or the washer 8 may be formed with a plurality of tongues 10, extending radially from the bolt-receiving opening and adapted to be bent against the several sides of the nut for the purpose specified. Where the ordinary form of bolt is employed, a separate lock may be employed, both for the nut and the head of the bolt, and where carriage-bolts are used a single washer 11 may be employed, said washer being rigidly secured in position and provided with an angular opening adapted to receive the angular portion of the bolt.

In operation the tongue 7 on the outer washer is placed in the slot 6 in the inner washer and the two placed upon the bolt in the usual manner, the inner plate engaging with the ridge 4, which prevents it from turning. The nut 2 is then screwed into position and the end 9 of the outer washer or the series of tongues 7, should it be formed with same, bent outwardly, so as to engage with the sides of said nut. In order to remove the nut, it is simply necessary to bend the tongues back, and when the washer 8 is made of suitable material the nut-lock can be used repeatedly. The opening in the outer washer 8 is preferably made elliptical in shape, the major axis running in the direction of the tongue 7. This enables a certain amount of play to be had, which facilitates the placing of the washers in position upon the bolt.

Having thus described the invention, what is claimed as new is—

1. In a nut-lock, the combination of a bolt, a nut coöperating therewith, an inner washer member provided with an opening, means for preventing said inner washer from turning, an outer washer having a tongue which passes through the opening in the inner washer, said outer washer being also provided with an elongated bolt-receiving opening, and means for securing an interlocking connection between the outer washer and the nut.

2. In a nut-lock, the combination of a bolt, a nut coöperating therewith, an inner washer provided with an opening, means for preventing the inner washer from turning, an outer washer having a tongue which passes through the opening in the inner washer and fits against the inner face of said washer, said outer washer being also provided with an elongated bolt-receiving opening, and means for securing an interlocking connection between the outer washer and the nut.

3. In a nut-lock, the combination of a bolt, a nut coöperating therewith, an inner washer provided with an opening, means for preventing the inner washer from turning, an outer washer having a tongue, which passes through the opening in the inner washer and fits against the inner face of said washer, said outer washer being also provided with an elongated bolt-receiving opening, and a tongue projecting from the outer washer member and bent outwardly against a side of the nut.

In testimony whereof I affix my signature in presence of two witnesses.

NOAH HOWELL. [L. S.]

Witnesses:
J. H. FREEMAN,
JACK W. DOWNEY.